United States Patent [19]

Riza

[11] Patent Number: 5,329,118
[45] Date of Patent: Jul. 12, 1994

[54] OPTICAL TRANSVERSAL FILTER

[76] Inventor: Nabeel A. Riza, 69 Westbury Ct., Clifton Park, N.Y. 12065

[21] Appl. No.: 996,203

[22] Filed: Dec. 23, 1992

[51] Int. Cl.[5] .............................................. H01J 5/16
[52] U.S. Cl. .................................. 250/227.12; 385/27
[58] Field of Search ............... 250/201.9, 216, 227.12; 374/372, 375; 385/27, 173; 359/124

[56] References Cited

U.S. PATENT DOCUMENTS

| | | | |
|---|---|---|---|
| 4,976,518 | 12/1990 | Burns | 385/27 |
| 5,117,239 | 5/1992 | Riza | 342/375 |
| 5,177,488 | 1/1993 | Wang et al. | 250/227.12 |

OTHER PUBLICATIONS

Dolfi, et al., "Two-dimensional Optical Architecture for Time-Delay Beam Forming in a Phased-array Antenna", Optics Letters, Feb. 15, 1991, vol. 16, No. 4, pp. 255-257.
Toughlian & Zmuda, "Variable Time Delay for RF/Microwave Signal Processing", SPIE vol. 1476, Optical Technology for Microwave Applications V (1991), pp. 116-119.
Toughlian & Zmuda, "Deformable Mirror-Based Optical Beamforming Systems for Signal Processing and Phased Array Applications", Abstract presented at First Annual DARPA/RADC Symposium on Photonics Systems for Antenna Applications, Monterey, Calif., Dec. 90, p. 278.
Ser. No. 07/826,501, filed 27 Jan. 1992 entitled "Time-Multiplexed Phased-Array Antenna Beam Switching System".
Ser. No. 07/847,155, filed 5 Mar. 1992 entitled "Phased Array Antenna Controller".
Ser. No. 07/900,877, filed 18 Jun. 1992 entitled "Optical Time Delay Units for Phased Array Antennas".
Ser. No. 07/950,554, filed Sep. 25, 1992, entitled "High Signal to Noise Ratio Optical Signal Processing System".

Primary Examiner—David C. Nelms

[57] ABSTRACT

An optical transversal filter includes a processing system having a light source adapted to be modulated by an input electromagnetic signal and generate a plurality of collimated optical signals, a cascade of optical time delay units sequentially coupled to act upon the collimated optical signals passing from the light source to selectively differentially time delay respective ones of the optical signals, an optical trimmer device coupled to receive the differentially time delayed optical signals and to selectively attenuate respective ones of those signals, and a filter output assembly which receives and sums the optical signals from the trimmer device optically and converts the sum to a corresponding filtered electrical signal, or alternatively, converts the respective optical signals to electrical signals and electrically sums the signals. Each optical time delay unit includes a spatial light modulator having liquid crystal pixels disposed such that the polarization orientation of each respective optical signal is controlled by passing respective optical signals through respective ones of the pixels. Dependent on its polarization orientation, each optical signal passes through a delay assembly optically coupled to the respective spatial light modulator in the optical time delay unit on either a direct path or a delay path.

26 Claims, 3 Drawing Sheets

OPTICAL TRANSVERSAL FILTER

BACKGROUND OF THE INVENTION

This invention relates generally to optical signal processing systems and more particularly to transversal filters for use in processing wideband signals.

Communications systems and radar systems commonly use filters in the processing of electromagnetic signals detected by system receivers. For example, in a radar system the detected return signals usually must be filtered in order to extract a reliable signal to determine the position of the target. Nonrecursive finite impulse response filters are typically used for this purpose, such as a transversal filter, also known as a tapped delay-line filter.

A transversal filter includes multiple stages of time delays through which the signal to be filtered passes, with the output of each stage tapped to provide a respective signal to a trimmer amplifier that selectively adjusts the amplitude of that tapped signal according to an algorithm that produces a desired performance or signal output. Conventional transversal filters typically have electrical components to process the filter input signal, and a major disadvantage is the large number of electrical delay elements and amplifiers that are required. Such electrical filters are complex to assemble and maintain, and the number and nature of components in the trimmer circuit present numerous potential failure modes. Further, signal losses in the delay components coupled in sequential stages may reduce the filter's operational sensitivity.

Opto-electronic signal processing has been applied in a variety of communications and radar systems. For example, for phased array radar systems, opto-electronic processing can be used to generate either time delayed or phase shifted optical signals. Use of some optical architectures, such as those having deformable mirror devices (DMDs) to direct light beams along desired paths for processing, have also been applied to a transversal filter. See E. Toughlian, H. Zmuda, "Variable Time Delay for RF/Microwave Signal Processing", *SPIE Optical Technology for Microwave Applications V* (1991), vol. 1476, pp 116-19. DMDs, however, necessarily involve control of displacement of a mirror to achieve the desired processing of the optical signal, and this type of system is less rugged and potentially prone to calibration errors given the large number of mirrors with respective small displacements required in such systems.

Optically processing the differentially time delayed signals in an optical transversal filter provides superior performance over conventional electronic-only processing of signals by reason of, for example, low loss wide bandwidth signal processing. Ideally, a transversal filter is able to effectively process a wide bandwidth input signal, is compact, relatively immune to undesirable electromagnetic radiation, and straightforward to fabricate, operate, and maintain. Such a filter also desirably has inertialess, motion-free operation that is readily adapted for reliable operation in a number of environments, such as aircraft or ships.

It is accordingly an object of this invention to provide a high performance optical transversal filter for filtering wide bandwidth signals.

It is a further object of this invention to provide an optical based amplitude control apparatus that is relatively compact, lightweight, and inertialess.

SUMMARY OF THE INVENTION

In accordance with the present invention an optical transversal filter includes a laser source adapted to generate a plurality of optical signals modulated in correspondence with an electromagnetic input signal and a cascade of sequentially coupled optical time delay units that receive the optical signals from the laser source and act upon them to differentially time delay and attenuate selected ones of the optical signals. The last of the optical time delay units in the cascade of optical time delay units is optically coupled to an optical trimmer device, and a filter output assembly optically coupled to the trimmer device is disposed to receive the plurality of respectively differentially time delayed and attenuated optical signals and to convert the sum of these processed optical signals to a corresponding electrical signal.

Each optical time delay unit comprises a spatial light modulator (SLM) having an array of liquid crystal pixels disposed such that respective ones of the optical signals pass through respective pixels, thereby providing control of the linear polarization of each optical signal passing into the optical time delay unit. Each SLM is optically coupled to a delay assembly having an optical switch and a delay path apparatus such that an optical signal passing into the delay assembly is directed along a delay path or a direct path through the delay assembly dependent on the linear polarization of the respective optical signal. The optical switches typically comprise polarizing beam splitters and the delay path apparatus comprises a free space delay with light deflectors such as mirrors or prisms, or alternatively, optical fibers, disposed such that light deflected along the delay path travels a path that results in the modulated optical signal having a selected time delay with respect to a similarlymodulated optical signal that did not pass through the respective delay path.

The optical analog trimmer comprises a spatial light modulator (SLM) having an array of pixels and is optically coupled to an output polarizer. The optical analog trimmer device is optically coupled to the last of the optical time delay units in the cascade such that optical signals emanating therefrom pass through respective ones of the pixels in the trimmer SLM. The SLM is optically coupled to an output polarizer such that the degree of attenuation of an optical signal (light beam) passing from the output polarizer is controllable dependent on the manipulation of the polarization of the light beam as it passes through its respective pixel in the SLM.

A method of filtering a wideband signal with an optical transversal filter comprises the steps of modulating a laser source with the wideband signal to generate a plurality of corresponding optical signals having temporally synchronized pulses; processing the optical signals in an optical filter processing system so as to selectively time delay individual ones of the optical signals to generate a desired differential time delay between respective ones of the pulses in the optical signals; attenuating selected ones of the respective optical signals in an optical analog trimmer device; and summing the plurality of optical signals and generating a corresponding electrical signal. The radio frequency (rf) modulation summation can be done optically, or alternatively, electrically.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
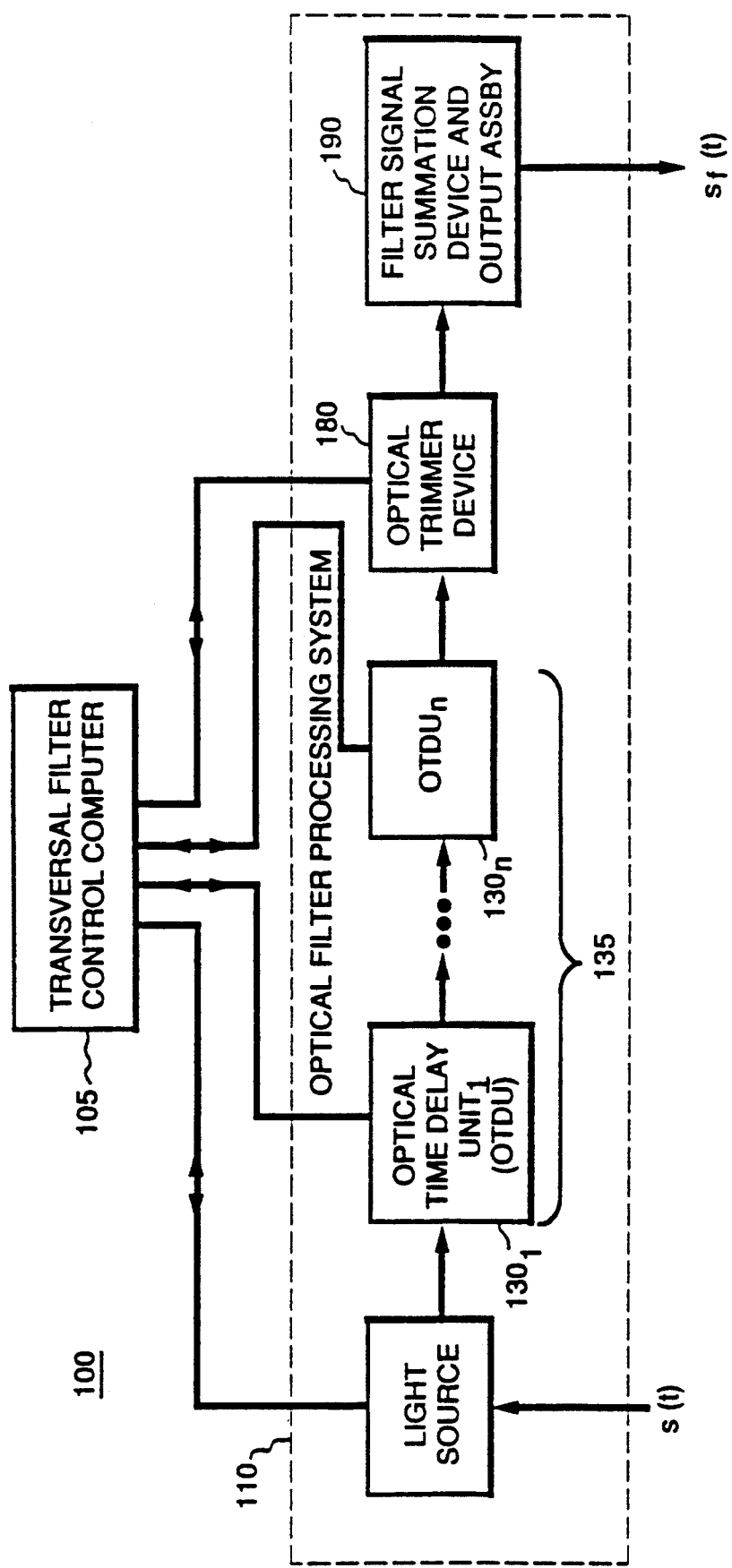
FIG. 1 is a block diagram of a optical transversal filter in accordance with the present invention.

In FIG. 1, an optical transversal filter 100 is shown comprising an transversal filter control computer 105 coupled to an optical filter processing system 110 which is adapted to receive an electromagnetic input signal s(t) and generate a filtered electromagnetic output signal $s_f(t)$. Optical filter processing system 110 comprises a light source 120, a plurality of optical time delay units (OTDU) $130_1$–$130_n$ optically coupled in a cascade 135 for acting upon the light beams produced by light source 120, an optical analog trimmer 180 coupled to $OTDU_n$, the last optical time delay unit in the cascade, and a filter output assembly 190 disposed to receive the optical signals passing from trimmer device 180 and to convert the optical signals to a corresponding electrical signal via optical, or alternatively, electrical, summation. Array control computer 105 is coupled to and generates signals to control and synchronize the operation, described below, of the components listed above so that optical filter processing system 120 provides the desired nonrecursive filtering of input signal s(t). In this arrangement, the plurality of OTDUs provide the time delay of the input signal s(t) and the optical trimmer device provides the selective weighting of the respective time-delayed signals derived in the cascade of OTDUs according to the desired filtering algorithm.

Figure 2A:
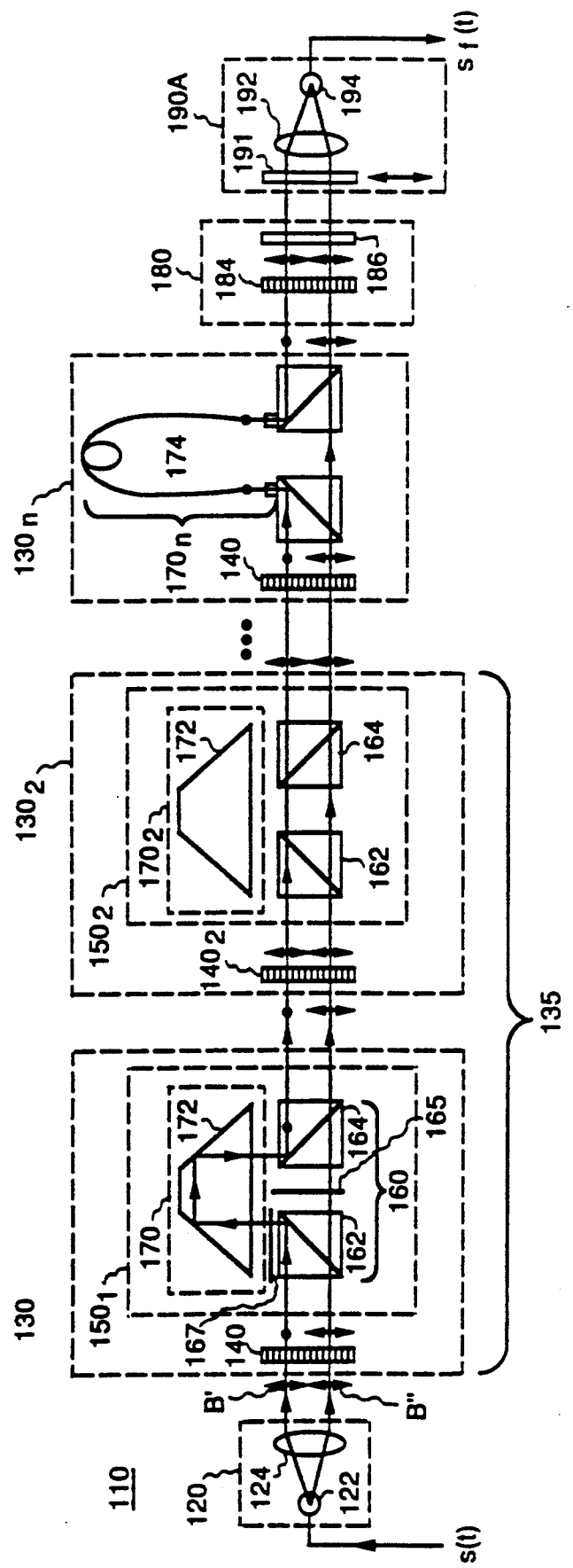
FIG. 2(A) is a schematic diagram of an optical transversal filter in accordance with one embodiment of the present invention.

FIG. 2(A) illustrates in greater detail certain components of optical transversal filter 100. Typically, input signal s(t) to filter 100 comprises wideband electromagnetic energy as may be detected by an antenna (not shown), signals generated in a processing system, or the like. Alternatively, optical transversal filter 100 is readily adapted for filtering optical signals, such as might be generated by optical signal processing systems.

Optical filter processing system 110 comprises the optical architecture to generate optical signals corresponding to input signal s(t), manipulate those signals to differentially time delay respective ones of the signals, differentially attenuate selected ones of the optical signals, sum the radio frequency (rf) modulations (also known as electrical modulations) of the processed optical signals and convert the sum to a corresponding electrical signal. As used herein, "optical architecture" refers to the combination of devices for manipulating the direction, diffraction, polarization, or the phase or amplitude of the light beams.

Light source 120 typically comprises a laser 122 such as a semiconductor laser or the like that can provide beam intensities, electrical modulation bandwidths, linearity, polarities, and spectral purity sufficient for operation of the optical filter processing system as described in this application. Laser 122 is optically coupled to a collimating lens 124 such that collimated linearly polarized coherent light beams pass from light source 120 into optical time delay unit (OTDU) $130_1$. The collimated light beams flood the face of OTDU $130_1$ and, as they pass through pixelated components of the OTDU, described below, form respective optical signals As used herein, "optically coupled" refers to an arrangement in which one or more light beams are directed from one optical component to another in a manner to maintain the integrity of the signal communicated by the light beam. The individual optical signals into which the output of laser 122 is divided in OTDU $130_1$ corresponds to the number of separate time delayed signals to be used in the filtering algorithm.

In accordance with this invention, the linear polarization of optical signals passing through respective OTDUs is manipulated to induce the desired time delay in a respective beam; it is thus advantageous that laser 122 generate linearly polarized light. Alternatively, non-polarized light can be generated and a polarizer (not shown) disposed to uniformly linearly polarize the light beams prior to entering OTDU $130_1$. For purposes of explanation, it will be assumed that the optical signals emanating from light source 120 are polarized in the horizontal plane (p-polarized), although vertical (s-polarized) light can alternatively be used with appropriate adjustments in the optical architecture.

Laser 122 is modulated by input signal s(t) such that the plurality of optical signals emanating from light source 120 are substantially identical in that each light beam corresponds to the rf modulating signal and is temporally synchronized.

Light passing from light source 120 enters cascade 135 comprising a plurality of OTDUs $130_1$–$130_n$ that are sequentially optically coupled. Each OTDU 130 (all OTDUs in the cascade having similar components) comprises a spatial light modulator 140 optically coupled to a delay assembly 150; each delay assembly 150 further comprise an optical switch 160 optically coupled to a delay path apparatus 170.

Each SLM 140 comprises a two-dimensional (2-D) pixel array arranged such that each optical signal emanating from light source 120 passes through a respective one of the pixels. Each pixel advantageously comprises a liquid crystal cell that is individually controllable, that is, control voltages unique to that cell can be applied such that the rotation of the liquid crystals in any given pixel can be selected independent of control voltages applied to other pixels in the array. Such independently controllable pixel arrays typically comprise separate means of addressing each cell, such as dedicated voltage application address connections. Nematic liquid crystals or, alternatively, ferroelectric liquid crystal cells, can be used in the array. Each pixel in SLM 140 acts as a polarization rotator, rotating the polarization of the incident optical signal by 0° or 90° dependent on the control voltages applied to the liquid crystals in the cell. Application of a control voltage to select a particular polarization for an optical signal is controlled by transversal filter control computer 105 (FIG. 1).

Each optical switch comprises an input polarizing beam splitter (PBS) 162 and an output PBS 164 that are optically coupled and disposed such that optical signals passing from the respective SLM 140 in the OTDU are incident on the respective input PBS 162. The PBSs illustrated in FIG. 2(A) are cube PBSs in which light of a predetermined polarization is deflected by 90°; alternatively, other types of PBSs, such as a Thompson PBS, in which light is deflected at an angle other than 90°, can be used in optical switch 160. Dependent on the linear polarization of the incident optical signal, the light either passes along a direct path or along a delay path through delay assembly 150. Light of a predetermined polarization, for example p-polarized light, passes undeflected through input PBS 162 and enters output PBS 164. Output PBS 164 is disposed such that light having the polarization that causes it to pass through input PBS undeflected and hence along the direct path (in this example, p-polarized light), also passes through output PBS 164 substantially undeflected. Light of the opposite polarization, that is s-polarized light, is deflected in input PBS 162 such that it passes along the delay path into delay path apparatus 170.

Delay path apparatus 170 typically comprises a light deflection device such as a free space delay prism 172, mirrors, or the like, disposed such that optical signals deflected into the delay path pass along a selected distance in the delay path and are directed into output PBS 164 along an axis that causes light of this polarization (s-polarized in the example used herein) to be deflected onto a path substantially aligned with the path on which the optical signal entered input PBS 162. As illustrated in OTDU 130$_n$, a optical fiber 174 (a representative one of which is shown in FIG. 2(A)) can alternatively be used to direct a deflected light beam along a delay path from input PBS 162 to output PBS 164 in a respective OTDU. Each optical fiber is typically coupled to its respective light switch 160 by a lens, such as a GRIN (graded index) lens.

The length of the delay path determines the time delay imparted to the optical signal in a respective OTDU. Typically each respective OTDU has a different length delay path that corresponds to the desired incremental time delay $\tau$ desired to be imparted to the signal to be filtered. Thus, for example, the cascade of OTDUs is advantageously arranged such that sequentially coupled OTDUs comprise respective delay paths of sufficient length to respectively introduce delays of $\tau$, $2\tau$, $3\tau$, etc. As one optical signal can be directed through multiple delay paths as it passes through the cascade, a large number of possible time delays are obtainable with relatively few OTDUs coupled in the cascade.

Advantageously each OTDU comprises a direct path polarizer 165 and a delay path polarizer 167. Polarizer 165 is optically coupled to switch 160 such that optical signals passing along the direct path pass through direct path polarizer 165, which passes substantially only light having the predetermined polarization to be directed along the direct path in input PBS 162 (in this example, p-polarized light). Polarizer 167 is optically coupled to switch 160 such that optical signals passing along the delay path pass through delay path polarizer 167, which passes light of the predetermined polarization for the delay path, e.g., s-polarized light in the example herein. Polarizers 165, 167 comprise sheet polarizers or the like and serve to reduce noise in the system by ensuring that substantially only light of the desired polarization passes along the respective direct and delay paths in each OTDU. For ease of illustration, polarizers 165 and 167 are shown only in OTDU 130$_1$.

The last OTDU in the cascade, OTDU$_n$, is optically coupled to optical trimmer device 180. Optical analog trimmer device 180 comprises an SLM 184 optically coupled to an output polarizer 186. SLM 184 comprises a two-dimensional (2-D) array of liquid crystal pixels. Each liquid crystal pixel advantageously comprises a nematic liquid crystal cell that is individually controllable, that is, control voltages unique to that cell can be applied such that the amount of rotation of the liquid crystals in any given pixel can be selected independent of control voltages applied to other pixels in the array. Such independently controllable pixels are typically provided by separate means of addressing each cell, such as dedicated voltage application address connections.

The optical signals entering trimmer SLM 184 have a known linear polarization, and thus a desired polarization rotation can be applied in trimmer SLM to produce optical signals having selected linear polarizations incident on trimmer SLM 184. The orientation of the transmission axis of output polarizer 184 is disposed such that, dependent on the polarization orientation of light beams emanating from trimmer SLM 184, the light beams are selectively attenuated as they pass through output polarizer 186. Further details of an optical analog trimmer are disclosed in the copending application of N. Riza entitled "Optical Analog Trimmer Device", Ser. No. 993,886, filed Dec. 23, 1992, assigned to the assignee of the present invention, and incorporated herein by reference.

In accordance with the present invention, the differentially time delayed optical signals pass into optical trimmer device 180 in which selected ones of the optical signals are attenuated in accordance with the filter algorithm for amplitude weighting respective ones of the time delayed signals. The degree of attenuation is determined by the degree of linear polarization rotation imparted to the optical signal passing through respective pixels by the the liquid crystals in each respective pixel in trimmer SLM 184. Control of the degree of liquid crystal deflection through the application of a control voltages to the pixel enables the amount of polarization rotation of the optical signal passing through a respective pixel to be precisely controlled in an analog fashion, which results in a corresponding attenuation of the optical signal as it passes through output polarizer 186.

Optical trimmer 180 is optically coupled to filter output assembly 190 (FIG. 1). Filter output assembly advantageously comprises an optical summing unit 190A, illustrated in FIG. 2(A), or alternatively, an electrical summing unit 190B, illustrated in FIG. 2(B). Optical summing unit 190(A) comprises a moving optical diffuser 191, a focussing lens 192, and a photosensor 194. Moving optical diffuser 191 is disposed to receive the optical signals passing from trimmer 180 and optically coupled to focussing lens 192 which focuses the optical signals onto photosensor 194, which typically comprises a photodiode or the like. The plurality of respectively differentially time delayed, attenuated, and mutually incoherent optical signals are thus summed and converted to a corresponding filtered electrical output signal $s_f(t)$.

Moving optical diffuser 191 comprises a random phase media that causes the respective optical signals to be temporally mutually incoherent. See, e.g., J. S. Goodman, *Statistical Optics*, (1985), pp. 193-195, which is incorporated herein by reference. Movement of the diffusing medium (such as ground glass) is along one or more axes in the plane of the diffuser, for example as indicated by the vertical arrow in FIG. 2(A). Prior to entering moving diffuser, each optical signal is temporally coherent as all the optical signals emanate from the same laser source. The moving optical diffuser enables the addition of the rf modulations of the spatially separate and differentially time delayed optical signals without introducing optical mixing effects, which would further lead to rf mixing, harmonics, and the like, by introducing pseudo-random relative phase shifts in the spatially separate optical signals. Moving optical diffuser 191 thus randomizes of phase of the optical wavefront presented by the plurality of optical signals, i.e., makes the temporally coherent laser light partially incoherent.

Figure 2B:
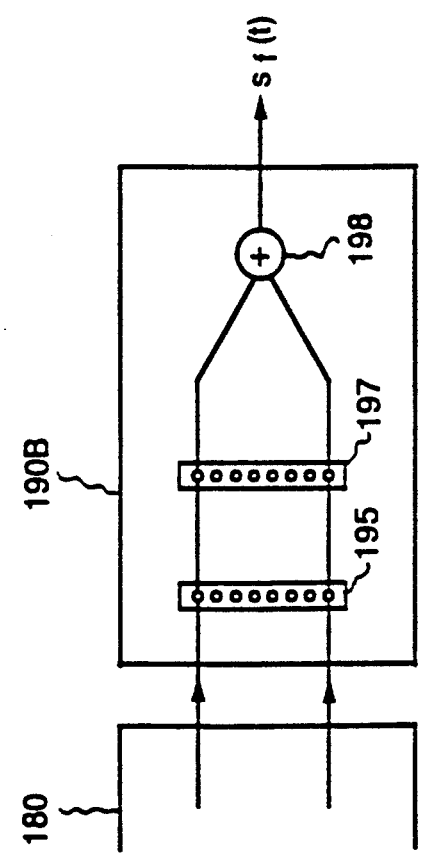
FIG. 2(B) is a schematic diagram of an electrical summer unit in accordance with another embodiment of the present invention.

Alternatively, electrical summer 190B (FIG. 2(B) is optically coupled to receive optical signals passing from trimmer 180. Electrical summer 190B typically comprises a lenslet array 195, respective lenses of which are disposed to receive respective ones of the spatially separate optical signals and focus the optical beams on a photosensor array 197, comprising photodiodes or the like, which convert each respective optical signal to a corresponding electrical signal. The plurality of photosensors in array 197 are electrically coupled to an electrical summer 198 which generates the filtered electrical output signal $s_f(t)$.

In filter operation, for example, filter electromagnetic input signal s(t) modulates laser 122 to produce a plurality of light beams comprising temporally synchronized pulses corresponding to the modulating signal. The beams are collimated as they pass through collimating lens 124; two representative beams, B' and B" are shown in FIG. 2(A). For purposes of this explanation, it is assumed the optical signals passing from light source 120 are p-polarized, as illustrated by the double headed arrow in the plane of the illustration.

The optical signals pass from light source 120 into cascade 135 of OTDUs $130_1$-$130_n$. In first OTDU $130_1$, all of the incident optical signals pass through SLM 140 in which the linear polarization of the respective optical signals is either rotated by 90° or not rotated. For example, beam B" is shown as not undergoing a polarization rotation before it passes into input PBS 162 of optical switch 160. The p-polarized beam B" passes through optical switch 160 along the direct path and into the next sequentially coupled OTDU $130_2$. For purposes of this illustration, beam B" is shown as not undergoing any polarization rotation in any OTDU, and thus it passes on each respective direct path through to cascade output polarizer 137.

Beam B', on the other hand, is shown as undergoing a polarization rotation in SLM 140 of OTDU 1301 such that it becomes s-polarized light, as indicated by the dot, representing vertically polarized light with respect to the plane of the Figure. S-polarized light is deflected in input PBS 162 onto the delay path towards delay path apparatus 170. Beam B' passes along the delay path and is deflected in mirror prism 172 such that it enters output PBS 164 of OTDU $130_1$ and, upon striking the beam splitting surface in PBS 164, is again deflected, onto a path that is substantially aligned with the path on which beam B' was passing when it entered delay assembly 150 of OTDU $130_1$. The pulse in beam B', having traveled a longer distance through OTDU 1301 than beam B", is time delayed with respect to the corresponding pulse (i.e., the respective pulses that were originally temporally synchronized) in beam B".

Beam B' is shown as undergoing a polarization rotation back to p-polarized light in SLM 140 of second OTDU $130_2$, and consequently beam B' passes through OTDU $130_2$ on the direct path, and no further differential time delay is introduced between the beams in this OTDU. Finally, for purposes of illustration, beam B' is shown as being polarization rotated in SLM 140 of last OTDU $130_n$, and consequently passing through the respective delay path in that time delay unit. Beam B' is thus s-polarized as it passes from cascade 135 and into optical trimmer 180. The linear polarization of each respective beam is known (that is determinable based upon the previous polarization manipulations in cascade 135) as it enters trimmer 180, therefore allowing further manipulation of the polarization to obtain the desired attenuation. The optical signals passing from cascade 135 are differentially time delayed in increments of $\tau$ (having passed through one or more OTDUs having delay paths that introduce an incremental time delay of $x\tau$ ($x=0$ to $n$) and thus the respective pulses in differentially time-delayed signals do not temporally overlap In optical trimmer 180 the optical signals are selectively attenuated; the degree of attenuation is determined by analog control of the degree of deflection of liquid crystals in pixels in the optical analog trimmer device. Filter control computer 105 is coupled to trimmer 180 such that the desired weighting for each respectively time delayed signal is used to determine the amount of attenuation (if any) for the respective optical signals.

Optical signals passing from trimmer 180 are summed and converted to a corresponding filtered electrical signal in filter output assembly 190, as described above.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An optical transversal filter for processing an electromagnetic input signal comprising:

a light source adapted to generate a plurality of optical signals modulated in correspondence with said input signal;

a plurality of optical time delay units optically coupled in a cascade, said cascade being optically coupled to said light source and adapted to differentially time delay selected ones of said plurality of optical signals passing therethrough;

an optical trimmer device optically coupled to the last of said optical time delay units in said cascade; and a filter output assembly coupled to said optical trimmer device, said filter output assembly being adapted to convert the sum of the plurality of processed optical signals to a corresponding filtered electrical signal;

each of said optical time delay units comprising a spatial light modulator (SLM) having an array of liquid crystal pixels disposed such that respective ones of said optical signals pass through respective pixels.

2. The filter of claim 1 wherein each of said optical time delay units further comprises:
a delay assembly optically coupled to said SLM, said delay assembly comprising an optical switch and a delay path apparatus, said optical switch and delay path apparatus being optically coupled such that an optical signal passing from said SLM into said delay path apparatus is directed along a direct path or a delay path through said delay assembly in dependence on the linear polarization of said respective optical signal.

3. The filter of claim 2 wherein said liquid crystal pixels comprise nematic liquid crystal cells.

4. The filter of claim 3 wherein said delay assembly optical switch comprises a polarizing beam splitter (PBS).

5. The filter of claim 1 wherein said delay path apparatus comprises a device selected from the group of light deflecting prisms and optical fibers.

6. The filter of claim 1 wherein said optical trimmer comprises a trimmer attenuation control spatial light modulator (trimmer SLM) having an array of liquid crystal pixels arranged in a pattern corresponding to the pattern of the delay assembly SLM.

7. The filter of claim 6 wherein each of said liquid crystal pixels in said trimmer SLM is coupled to a voltage source so as to be respectively individually controllable.

8. The filter of claim 7 wherein said filter output assembly comprises an optical summing unit.

9. The filter of claim 8 wherein said optical summing unit comprises a moving diffuser, a focussing lens and a photosensor, said moving optical diffuser being optically coupled to receive said plurality of optical signals passing from said optical trimmer and to randomize the phase of respective ones of said optical signal; said focussing lens being optically coupled to said moving optical diffuser and disposed to focus said plurality of optical signals on said photosensor such that the plurality of optical signals are optically added and converted to a corresponding filtered electrical output signal.

10. The filter of claim 9 wherein said moving optical diffuser comprises a random phase media disposed to move along an axis.

11. The filter of claim 7 wherein said filter output assembly comprises an electrical summing unit.

12. The filter of claim 11 wherein said electrical summing unit comprises a photosensor array disposed to convert respective ones of said optical signals to corresponding respective electrical signals, and an electrical summer electrically coupled to said photosensor array such that the plurality of electrical signals is electrically summed to generate a filtered electrical output signal.

13. The filter of claim 7 wherein said light source comprises a laser and a collimating lens optically coupled to said laser and to said cascade of optical time delay units such that modulated light signals passing from said laser source are collimated along paths causing them to pass through respective pixels in said optical time delay unit SLM.

14. The filter of claim 7 wherein said optical trimmer further comprises an output polarizer.

15. The filter of claim 4 wherein said PBS comprises a cube PBS.

16. The filter of claim 1 wherein said light source comprises a laser for generating said plurality of optical signals in the form of coherent linearly-polarized laser light.

17. The filter of claim 7 further comprising a filter control computer coupled to said optical filter processing system to selectively control the time delay imparted to each respective optical signal in said cascade of optical time delay units and to selectively control the attenuation of each respective optical signal in said optical trimmer.

18. The filter of claim 2 wherein each of said delay path apparatuses is disposed to provide a respective delay path having a respective length to generate an incremental time delay corresponding to a selected delay in an optical signal passing therethrough.

19. A method of filtering a wideband signal with an optical transversal filter comprising the steps of:
modulating a laser source with said wideband signal to generate a plurality of corresponding optical signals, each of said optical signals comprising respective temporally synchronized pulses;
processing said plurality of optical signals in a beam processing system so as to selectively time delay individual ones of said optical signals to generate a desired differential time delay between the respective ones of the pulses in said optical signals;
attenuating selected ones of the respective optical signals emanating from said beam processing system by passing the signals through an optical analog trimmer device; and
summing the plurality of optical signals and generating a corresponding electrical signal.

20. The method of claim 19 wherein the step of processing said plurality of optical signals comprises:
directing said optical signals through a cascade of optical time delay units; and
in each respective optical time delay unit, selectively directing each of said optical signals along a respective delay path or a respective direct path through said optical time delay unit such that selected ones of said optical signals are time delayed with respect to the other optical signals.

21. The method of claim 20 wherein the step of selectively directing each of said optical signals through said optical time delay unit comprises the steps of:
selecting the polarization orientation of each respective optical signal passing into said optical time delay unit; and
passing each respective optical signal into a delay assembly having a polarizing beam splitter disposed to respectively direct each of said optical signals along said direct path or said delay path dependent on the polarization orientation of the respective light beam.

22. The method of claim 21 wherein the step of selecting the polarization orientation of each respective optical signal comprises:
passing said plurality of optical signals through a spatial light modulator (SLM) such that each optical signal passes through a respective liquid crystal pixel in said SLM; and
controlling the displacement of the liquid crystals in each respective pixel such that the desired polarization rotation is imparted to the respective light beam passing therethrough.

23. The method of claim 22 wherein the step of selectively attenuating selected ones of said optical signals further comprises passing each of said optical signals through a spatial light modulator having an array of pixels such that the degree of attenuation of respective ones of the optical signals is determined by analog control of the degree of deflection of the respective liquid crystal pixel in said optical analog trimmer device through which the light beam passes.

24. The method of claim 23 wherein the step of attenuating selected ones of said optical signals further comprises:
  directing each of said optical signals through said spatial light modulator (SLM) having an array liquid crystal pixels such that each optical signal passes through a respective one of said pixels;
  respectively controlling the deflection of the liquid crystals in each of said pixels to determine the polarization rotation imparted to the optical signal passing therethrough; and
  directing said optical signals through an output polarizer.

25. The method of claim 22 wherein the step of summing said plurality of optical signals comprises the steps of:
  randomizing the phase of respective ones of said optical signals;
  optically adding said plurality of optical signals; and
  converting the sum of the added optical signals to a filtered electrical output signal.

26. The method of claim 22 wherein the step of summing said plurality of optical signal comprises the steps of:
  converting each of said optical signals to a corresponding electrical signal; and
  electrically adding the corresponding electrical signals to generate a filtered electrical output signal.

* * * * *